United States Patent [19]
Hastreiter

[11] Patent Number: 6,164,402
[45] Date of Patent: Dec. 26, 2000

[54] CONTROL OF PUMP FOR HYDRAULIC FRONT WHEEL DRIVE

[75] Inventor: James J. Hastreiter, Chanhassen, Minn.

[73] Assignee: Eaton Corporation, Cleveland, Ohio

[21] Appl. No.: 09/195,496

[22] Filed: Nov. 18, 1998

[51] Int. Cl.[7] .................................................. B60K 17/356
[52] U.S. Cl. ......................... 180/243; 180/307; 701/54; 60/445
[58] Field of Search .................................... 180/243, 242, 180/305, 307, 308; 701/50, 54, 53; 60/445

[56] References Cited

U.S. PATENT DOCUMENTS

| | | | |
|---|---|---|---|
| 5,147,010 | 9/1992 | Olson et al. | 180/197 |
| 5,249,422 | 10/1993 | Smith et al. | 60/445 |
| 5,361,208 | 11/1994 | Olson et al. | 364/424.05 |
| 5,420,791 | 5/1995 | Olson et al. | 364/424.05 |
| 5,474,147 | 12/1995 | Yesel | 180/197 |
| 5,564,519 | 10/1996 | Katoh et al. | 180/243 |
| 5,576,962 | 11/1996 | Ferguson et al. | 60/445 |
| 5,687,808 | 11/1997 | Watanabe et al. | 180/243 |

*Primary Examiner*—Brian L. Johnson
*Assistant Examiner*—Avraham H. Lerner
*Attorney, Agent, or Firm*—L. J. Kasper

[57] ABSTRACT

A vehicle propel system, including a hydrostatic transmission having wheel motors (37L,37R) and a variable displacement pump (39), variable in response to a pump displacement command signal (51). The system involves determining (67) anticipated motor flow, and generating a signal (69) corresponding thereto. A pressure command signal (77) corresponds to the desired pump pressure. Actual motor flow is sensed (75), and a processor (49) calculates pump flow and compares it to actual motor flow (75) to determine system leakage (107). The processor then modifies the anticipated motor flow signal (69) to compensate for system leakage (107), and generates the appropriate pump displacement command signal (51). The use of feed-forward terms, such as anticipated motor flow (69), pump speed and commanded pressure times leakage gain to calculate desired pump displacement allow a lesser gain to be used for the feedback term (measured pump pressure 59), thereby reducing "wheel hop".

4 Claims, 3 Drawing Sheets

CONTROL OF PUMP FOR HYDRAULIC FRONT WHEEL DRIVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates generally to vehicle drive systems, and more particularly, to a control system for a variable displacement pump useable in a vehicle propel system, such as an auxiliary front wheel drive system.

On a typical motor grader, the rear wheels are driven mechanically by the engine, through a mechanical transmission and differential gear set. It has become well known in the art to supplement such a main, mechanical drive system by means of a hydrostatic, auxiliary front wheel drive system, which is also sometimes referred to as a "supplemental" drive system. Although the pump of the present invention may be utilized on a vehicle having mechanically driven front wheels and hydrostatically driven rear wheels, it is especially advantageous when used on vehicles such as motor graders which typically have mechanically driven rear wheels and hydrostatically driven front wheels, and will be described in connection therewith.

Specifically, the auxiliary drive system includes a fluid pump driven by the engine for providing pressurized fluid to a pair of hydraulic motors, each of which drives one of the front wheels, thereby supplementing or assisting the main, rear wheel drive system. Typically, the fluid pump comprises a variable displacement pump, such as an axial piston pump of the swashplate type. In such a pump, the displacement of the pump is controlled by a pair of stroking cylinders which are actuated by control pressure from a charge pump, with the communication of control pressure to a particular stroking cylinder being controlled by a servo system.

It is generally well known to those skilled in the art to provide an input to the servo system to control pump displacement, in response to various operating parameters of the vehicle drive system, such parameters typically including the speed of rotation of the main propel wheels, and the flow volume of the hydraulic wheel motors. Although such systems have typically controlled front wheel speed, attempts to control wheel torque have typically exacerbated an undesirable phenomenon referred to as "wheel hop", in which the front axle "hops" up and down as the front wheels alternate between an underspeed condition and an overspeed condition, relative to the rear propel wheels.

One of the problems with drive systems of the type described above is that a pressure compensated pump's output pressure is affected by hydraulic leakage, with the amount of leakage being approximately proportional to hydraulic pressure. To reduce the effect of hydraulic leakage on pump output pressure, pump displacement (and flow) is increased by an amount proportional to the product of pump pressure and a leakage gain. Prior to the present invention, a constant was used for the leakage gain, although, as is known to those skilled in the art, leakage gain is actually variable from pump to pump because of variations in part tolerances, operating temperature, and fluid viscosity.

SUMMARY OF THE INVENTION

Accordingly, it is an object of the present invention to provide a control system for a variable displacement, pressure compensated pump which is able to compensate for variations in actual system hydraulic leakage.

It is a more specific object of the present invention to provide a control system for a variable displacement, pressure compensated pump which compensates for system leakage by means of a feed-forward calculation, rather than merely trying to respond by measuring current actual conditions, such as instantaneous pump output pressure.

The above and other objects of the invention are accomplished by the provision of an improved vehicle propel system of the type comprising a pair of primary propel wheels receiving input torque from the vehicle engine by means of a primary transmission. A pair of secondary propel wheels receives input torque from a hydrostatic transmission including a wheel motor operatively associated with each secondary propel wheel. A variable displacement pump has means operable to vary the displacement thereof in response to a pump displacement command signal.

The improved vehicle propel system is characterized by means for determining anticipated motor flow to the wheel motors and generating a signal corresponding thereto. The system includes means for generating a pressure command signal corresponding to commanded pump pressure, and means for sensing actual motor flow to the wheel motors for the secondary propel wheels. The system further includes processor means for calculating pump flow and comparing pump flow to said actual motor flow to determine system leakage. The processor means modifies the pump displacement signal to compensate for the system leakage and generate the pump displacement command signal.

DESCRIPTION OF THE PREFERRED EMBODIMENT

Figure 1:
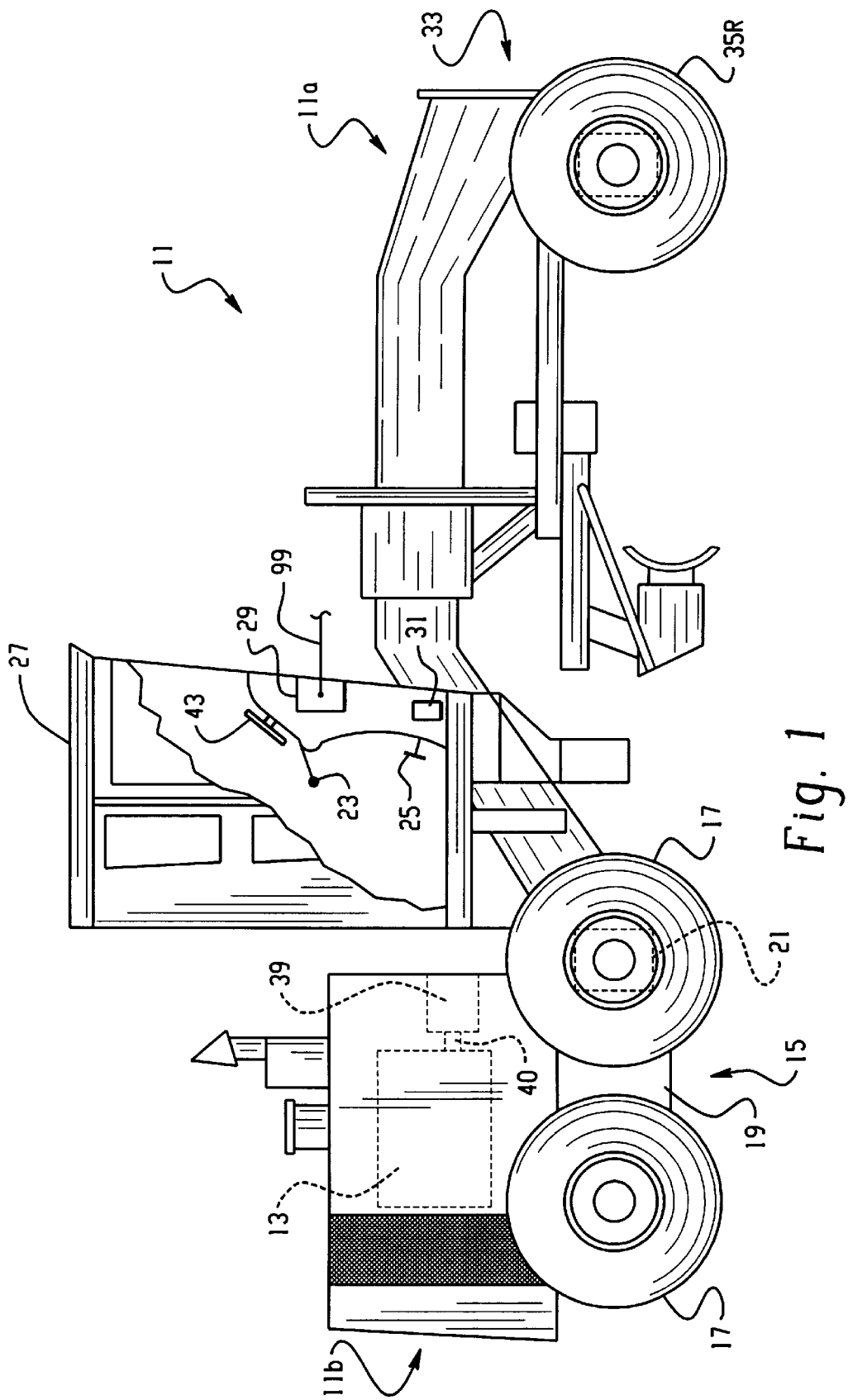
FIG. 1 is a side view of a typical articulated motor grader which is an example of a vehicle of the type with which the present invention may be utilized.

Referring now to the drawings, which are not intended to limit the invention, FIG. 1 illustrates an articulated motor grader, generally designated 11, including a front bogie portion 11a and a rear bogie portion 11b, the motor grader also having an engine 13 and a main drive system 15. The main drive system 15 includes two pairs of rear wheels 17, driven by the engine 13 through a conventional mechanical transmission 19, and a rear differential 21. The transmission 19 is responsive to a gear selector 23 and a clutch pedal 25, which are both located in an operator's compartment 27 of the motor grader 11.

Typically, the gear selector 23 is moveable between eight forward gear positions, a neutral position and at least several reverse gear positions. A gear selector sensor 29 produces a particular output signal corresponding to each of the positions of the selector 23. There is also a clutch pedal sensor 31, typically comprising an electrical switch, which provides an appropriate signal whenever the clutch pedal 25 is depressed (or released). The signals from the gear selector sensor 29 and the clutch pedal sensor 31 are transmitted in a manner well known to those skilled in the art for controlling actuation of the transmission 19.

Figure 2:
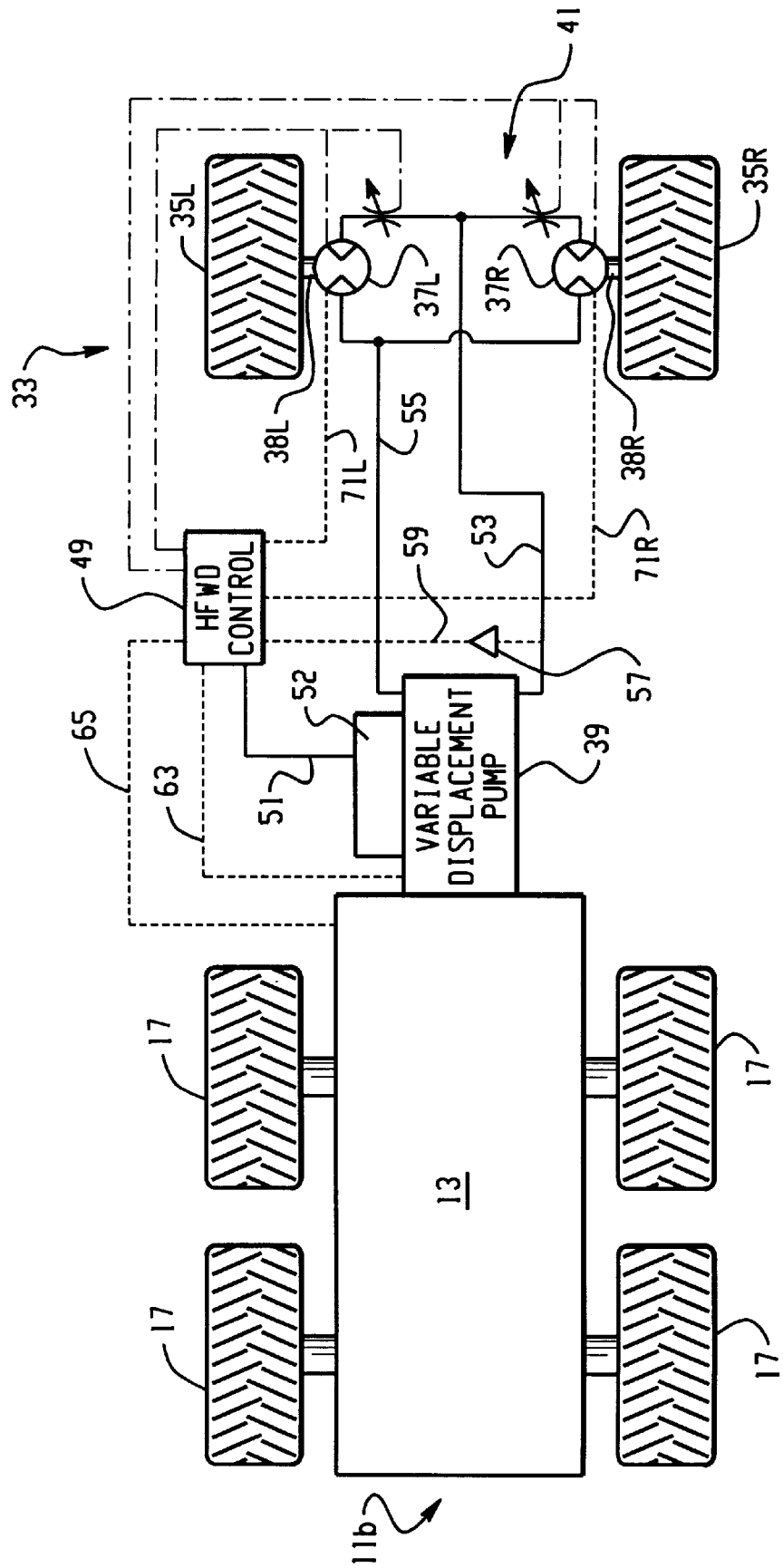
FIG. 2 is an overall hydraulic schematic of the auxiliary front wheel drive system utilizing the pump control system of the present invention.

Referring now to FIG. 2, in conjunction with FIG. 1, a supplemental hydrostatic front wheel drive (HFWD) system, generally designated 33 will be described. The HFWD system 33 includes left and right front drive wheels 35L and 35R, driven by hydraulic motors 37L and 37R, respectively, by means of axle shafts 38L and 38R, respectively. The motors 37L and 37R receive pressurized fluid from a variable displacement pump 39 (see also FIG. 1). The pump 39 receives input drive torque from the engine 13, by means of an input shaft 40 (shown only in FIG. 1), in a manner well known to those skilled in the art. Disposed between the pump 39 and the motors 37L and 37R is a valve assembly, shown only schematically herein, and generally designated 41, and which forms no part of the present invention and will not be described further herein. Those skilled in the art are aware that the front wheel drive system 33 is typically manually selected or engaged by the vehicle operator, and on most vehicles having front wheel drive systems, there is an appropriate "lock-out" feature, whereby the system 33 can be engaged at any time, except when the transmission is in neutral, or when the clutch is depressed (disengaged).

Also disposed in the operator's compartment or cab 27 is a steering wheel 43, the general function of which is to steer the front drive wheels 35L and 35R of the vehicle. This is typically accomplished by the use of a full fluid-linked steering control unit of the type sold commercially by the assignee of the present invention, but which forms no part of the invention, and will not be described further herein. Also illustrated in FIG. 2 is an HFWD control 49, which would typically comprise a vehicle microprocessor, and be located in the operator's compartment 27, and which transmits and receives various electrical signals to and from both the pump 39 and the valve assembly 41, as will be described in greater detail subsequently.

Figure 3:
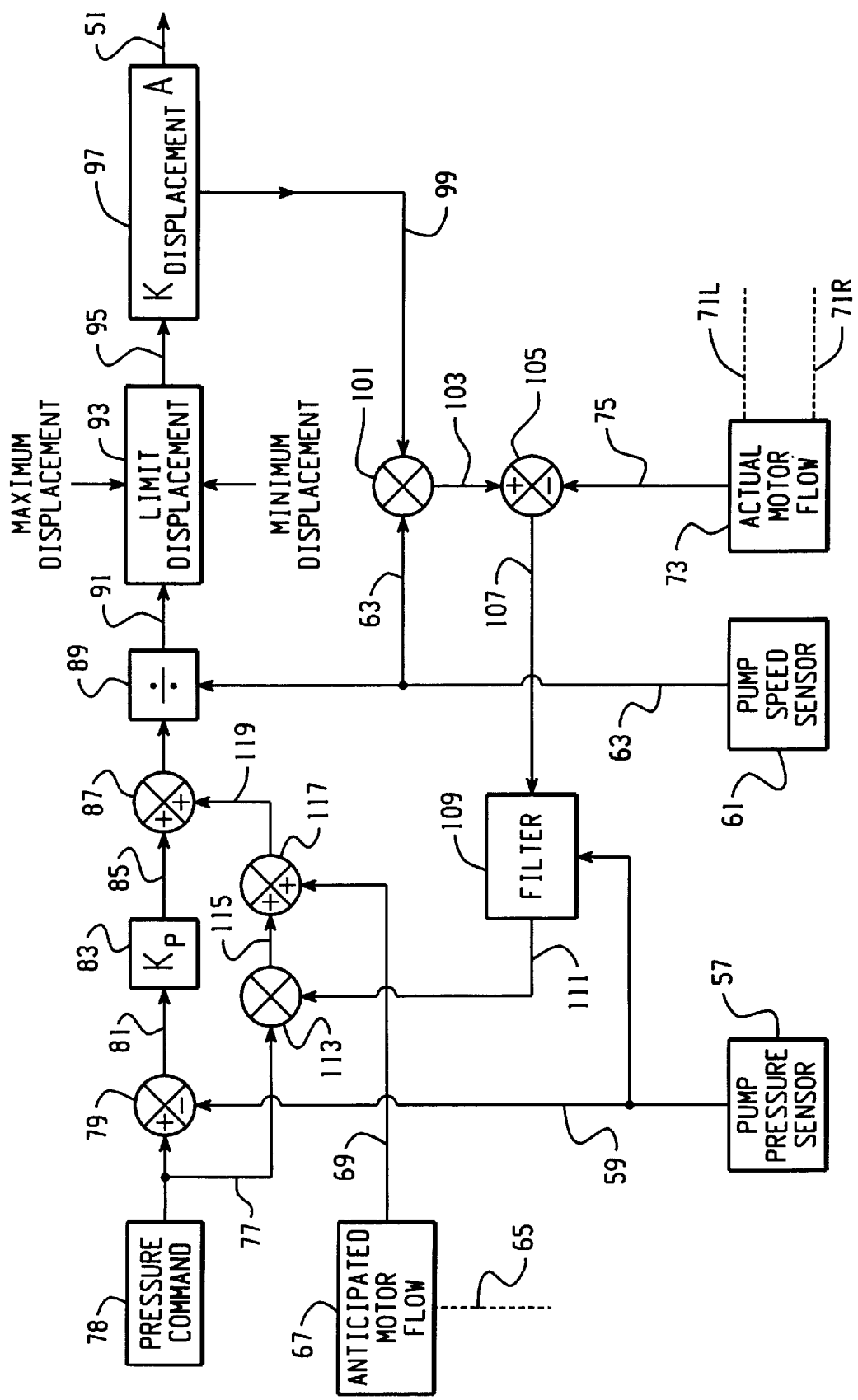
FIG. 3 is a logic diagram of the pump control system of FIG. 2, incorporating the present invention.

Referring now primarily to FIG. 3, the logic embodied in the HFWD control 49 will be described in some detail. The logic includes a number of inputs, which will be described, and the ultimate purpose of the logic is to generate a pump displacement command signal 51, to be transmitted to a controller 52 which, by way of example only, may be an electrohydraulic control, operable to vary the stroke (displacement) of the pump 39 in response to variations in the command signal 51. An important aspect of the present invention is to vary the displacement of the pump 39 in a manner which continuously compensates for any leakage in the system, so that the desired torque of the front drive wheels 35L and 35R may be maintained.

Referring now also to FIG. 2, the variable displacement pump 39 provides pressurized fluid to the hydraulic motors 37L and 37R by means of a pair of conduits 53 and 55, and schematically, there is shown a pump pressure sensor 57, in communication with the conduit 53, which is operable to transmit a pump pressure signal 59 to the HFWD control 49. A pump speed sensor 61 (shown only in FIG. 3) transmits a pump speed signal 63 to the control 49. A sensor (not shown) measures the speed of the rear wheels 17, and transmits a corresponding rear wheel speed signal 65 to the control 49, and specifically, to an operation block 67 in which the logic, by knowing the displacement (flow volume) of the hydraulic motors 37L and 37R, and steering angles and vehicle geometries, is able to generate a signal 69 representative of anticipated motor flow. It should be understood that the signal 69 represents only "theoretical" motor flow, i.e., the flow which would be required to drive the hydraulic motors 37L and 37R at the same speed as the rear wheels 17, if there were no leakage in the system. Information regarding the geometry of the vehicle steering system, as well as the instantaneous steering angle, are additional inputs to the operation block 67, although not shown in FIG. 3.

Associated with the front drive wheels 35L and 35R are a pair of sensors (not shown in the drawings) which generate a pair of front wheel speed signals 71L and 71R which are transmitted to an operation block 73 which, again based on knowing the displacement of the hydraulic motors 37L and 37R, determines a signal 75 representative of actual motor flow. Those skilled in the art will understand that, if the vehicle is turning, the front wheel speed signals 71L and 71R may be different, but in that case, the signal 75 will represent the sum of the flows to the motors 37L and 37R.

One other input to the HFWD control 49 is a pressure command signal 77, which is typically the result of a manual input, shown schematically at 78, by the vehicle operator. The signal 77 is transmitted to a summing junction 79 where the pump pressure signal 59 is compared to the pressure command signal 77, and an error signal 81 is generated, representative of the difference between the signals 59 and 77. The error signal 81 is then transmitted to an operation block 83, which applies a predetermined gain to the error signal 81, then transmits an amplified signal 85 to a summing junction 87, as one of its inputs, the other input to which will be described subsequently.

The output of the summing junction 87 is transmitted to an operation block 89 in which the output of the summing junction 87 is divided by the pump speed signal 63, thus effectively generating a pump displacement signal 91. The signal 91 is then transmitted to an operation block 93 in which the signal 91 is compared to predetermined maximum and minimum limits on the displacement permitted for the variable displacement pump 39. In other words, the operation block 93 insures that the control 49 does not attempt to command a pump displacement less than the minimum displacement limit or greater than the maximum displacement limit. The output of the block 93 is a signal 95 which is transmitted to an operation block 97, in which an appropriate gain is applied, then which generates the pump displacement command signal 51.

In accordance with one important aspect of the invention, the operation block 97 transmits a signal 99, representative of commanded pump displacement, to a multiplier 101, the other input to the multiplier 101 being the pump speed signal 63. The multiplier 101 multiplies the command signal 99 and the pump speed signal 63, and provides an output signal 103 representative of the instantaneous flow from the pump 39. The signal 103 is transmitted to a summing junction 105, the other input to which is the signal 75 representative of actual total flow to the motors 37L and 37R. By comparing the signal 103 representing actual pump flow and the signal 75 representing actual total motor flow, the summing junction 105 is able to generate a signal 107 representative of the instantaneous leakage in the system 33.

It should be noted that system leakage is assumed to be proportional to actual pump pressure, as represented by the signal 59. The leakage signal 107 is transmitted to an operation block 109 which is a "filter" operable to convert the instantaneous leakage signal 107 and the pump pressure signal 59 into a signal 111 which represents the leakage "gain" for the system. Where leakage equals pressure times the leakage gain, it should be noted that the filter calculations are done only if the pump pressure is more than a minimum amount, but less than the relief setting for the system. The leakage gain signal 111 is transmitted to a summing junction 113 which has, as its other input, the pressure command signal 77. The summing junction 113 multiplies the signal 77 and the signal 111 and generates a signal 115 representative of an adjustment in the pump displacement which is needed to compensate for leakage. The signal 115 is transmitted to a summing junction 117 which adds the signal 115 to the signal 69, representative of anticipated motor flow. The summing junction 117 generates an output signal 119 and transmits it as the other input to the summing junction 87, described previously.

Thus, the summing junction 87 is adding a signal (85) representative of a pump pressure "error" and a signal (119) representative of anticipated flow, adjusted for instantaneous leakage. As explained previously, the sum of the signals 85 and 119 is then utilized to generate the pump displacement command signal 51.

In accordance with an important aspect of the present invention, the necessary pump displacement, as commanded by the signal 51, is calculated primarily through the use of a feed-forward term, and to a much lesser degree, through the use of feedback terms, i.e., measured pump pressure and motor speeds. This is accomplished by having a smaller value for the constant K in the operation block 83, and by using a fairly large time constant in the filter 109.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A vehicle propel system of the type comprising a pair of primary propel wheels adapted to receive input torque from a vehicle engine by means of a primary transmission, and a pair of secondary propel wheels receiving input torque from a hydrostatic transmission including a wheel motor operatively associated with each secondary propel wheel, and a variable displacement pump having means operable to vary the displacement thereof in response to a pump displacement command signal; characterized by:

(a) means for determining anticipated motor flow to said wheel motors and generating an anticipated motor flow signal corresponding thereto;

(b) means for generating a pressure command signal corresponding to commanded pump pressure;

(c) means for sensing actual motor flow to said wheel motors for said secondary propel wheels;

(d) processor means for calculating pump flow and comparing pump flow to said actual motor flow to determine system leakage;

(e) processor means for modifying said anticipated motor flow signal to compensate for said system leakage and generate said pump displacement command signal; and (f) said means for determining anticipated motor flow to said wheel motors includes means for determining the actual speed of rotation of said pair of primary propel wheels, and the anticipated flow volume of said wheel motors, and further includes means for determining steering geometry and steering angle.

2. A hydrostatic transmission system of the type comprising a load, a hydraulic motor operably associated with said load, a variable displacement pump having means operable to vary the displacement thereof in response to a pump displacement command signal, said pump receiving input torque from a source of motive power, said system characterized by:

(a) means for determining anticipated motor flow to said hydraulic motor and generating an anticipated motor flow signal corresponding thereto;

(b) means for generating a pressure command signal corresponding to commanded pump pressure;

(c) means for sensing actual motor flow to said hydraulic motor;

(d) processor means for calculating pump flow and comparing pump flow to said actual motor flow to determine system leakage;

(e) processor means for modifying said anticipated motor flow signal to compensate for said system leakage and generate said pump displacement command signal; and (f) said processor means to compensate for said system leakage includes means operable to receive a motor speed signal, and calculate a leakage gain signal.

3. A hydrostatic transmission system as claimed in claim 2, characterized by means for constraining said pump displacement command signal within predetermined minimum and maximum pump displacements.

4. A vehicle propel system of the type comprising a pair of primary propel wheels adapted to receive input torque from a vehicle engine by means of a primary transmission, and a pair of secondary propel wheels receiving input torque from a hydrostatic transmission including a wheel motor operatively associated with each secondary propel wheel, and a variable displacement pump having means operable to vary the displacement thereof in response to a pump displacement command signal; characterized by:

(a) means for determining anticipated motor flow to said wheel motors and generating an anticipated motor flow signal corresponding thereto;

(b) means for generating a pressure command signal corresponding to commanded pump pressure;

(c) means for sensing actual motor flow to said wheel motors for said secondary propel wheels;

(d) processor means for calculating pump flow and comparing pump flow to said actual motor flow to determine system leakage;

(e) processor means for modifying said anticipated motor flow signal to compensate for said system leakage and generate said pump displacement command signal; and (f) said processor means to compensate for said system leakage includes means operable to receive motor speed signals, and calculate a leakage gain signal.

* * * * *